J. GREWE.
TIRE.
APPLICATION FILED JAN. 22, 1916.
1,253,960.
Patented Jan. 15, 1918.
2 SHEETS—SHEET 2.
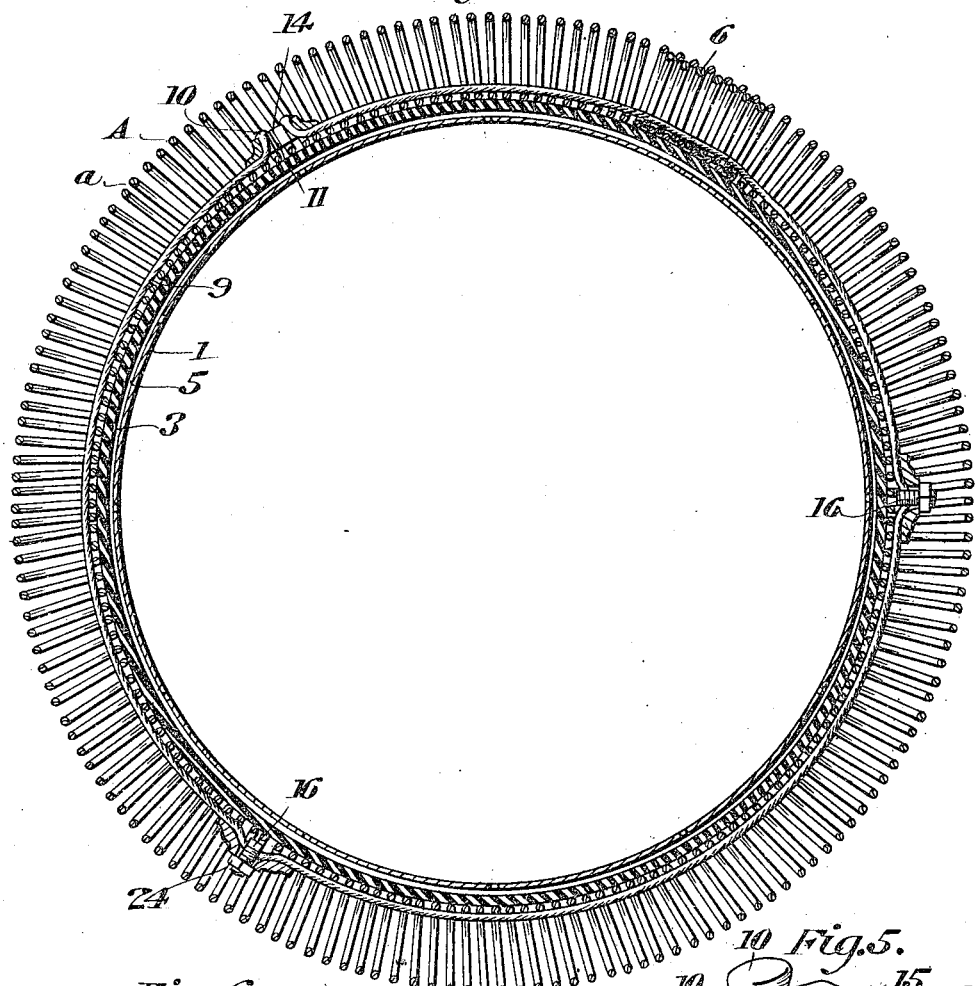
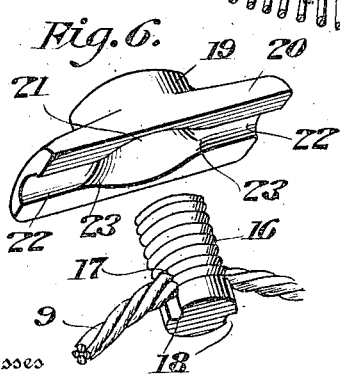
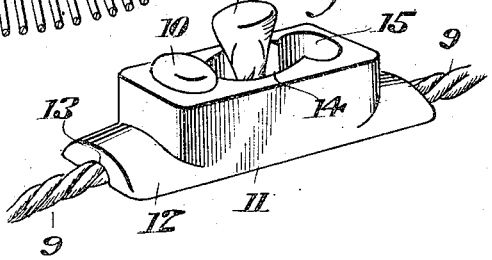
Witnesses
M. H. Slifer
R. M. Smith
Inventor
John Grewe
By Victor J. Evans
Attorney

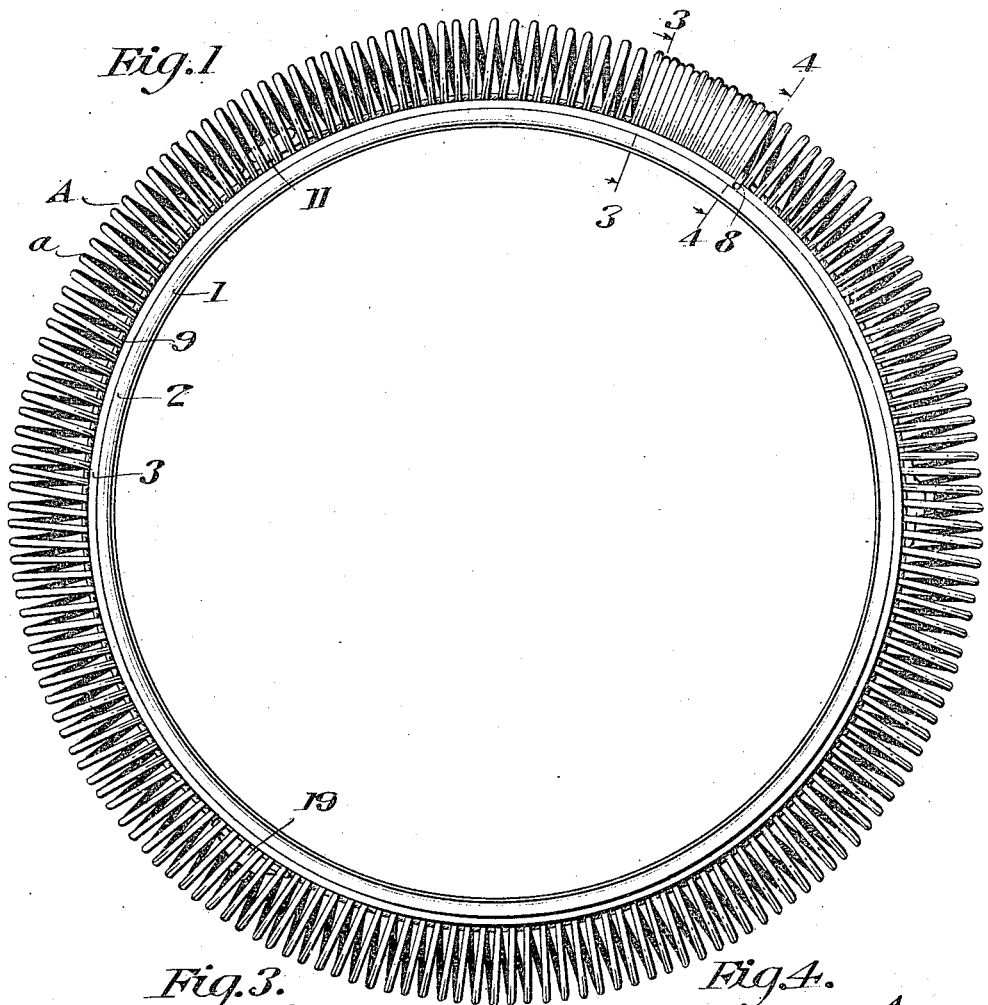

UNITED STATES PATENT OFFICE.

JOHN GREWE, OF CINCINNATI, OHIO.

TIRE.

1,253,960.

Specification of Letters Patent.

Patented Jan. 15, 1918.

Application filed January 22, 1916. Serial No. 73,658.

*To all whom it may concern:*

Be it known that I, JOHN GREWE, a citizen of the United States, residing at Cincinnati, in the county of Hamilton and State of Ohio, have invented new and useful Improvements in Tires, of which the following is a specification.

This invention relates to tires, for vehicles in general, and particularly tires used upon the wheels of motor driven vehicles such as automobiles, motor trucks and the like, the object of the invention being to produce a practically indestructible, puncture- and blow out-proof tire of materially increased tractive and non-skid properties.

A further object of the invention is to produce a tire which is not dependent in any way upon inflation, which is self-supporting or sustaining in its useful condition, which is composed almost exclusively of metal, which requires no outer casing, and which may be easily repaired while on the road, and which may also be given more or less tension and resiliency in accordance with the load imposed thereon, the said tire being adapted to absorb all ordinary road shocks and vibrations to practically the same extent as the pneumatic tire now in every day use.

A further object of the invention is to provide novel means including a flexible restraining and clamping member for fastening the body of the tire to the supporting rim thereof, means for coupling together the extremities of said restraining member, and means for straining said restraining member so as to contract the same in size.

With the above and other objects in view, the invention consists in the novel construction, combination and arrangement of parts, as herein described, illustrated and claimed.

In the accompanying drawings:—

Figure 1 is a side elevation of a tire embodying the present invention.

Fig. 2 is a central longitudinal section thereof.

Fig. 3 is a cross section on an enlarged scale on the line 3—3 of Fig. 1.

Fig. 4 is a similar section on the line 4—4 of Fig. 1.

Fig. 5 is a detail perspective view showing the coupling device for the extremities of the restraining member.

Fig. 6 is a perspective view of one of the restraining members, omitting the nut.

The tire contemplated in this invention comprises in the essential embodiment thereof a supporting member or rim 1. In the preferred embodiment of the invention, the rim 1 is provided with the annular side flanges 2 which in the present instance are employed for the purpose of confining therebetween an annular resilient cushioning band 3 of rubber or the like, the rim 1 being further provided on its outer face and between the flanges 2 with inwardly sloping annular shoulders 4 leaving therebetween an annular channel 5 into which the body of the cushioning band 3 is adapted to be pressed when the tire is subjected to excessive shocks and loads.

The body A of the tire consists of a primarily straight and cylindrical coil of spring material preferably round in cross section as illustrated in the drawings and resembling an ordinary cylindrical convolute spring. This spring coil is made of sufficient length to enable the same to be bent or curved entirely around the supporting rim 1 as indicated in Figs. 1 and 2 with all of the convolutions *a* thereof resting directly against and being supported by the resilient cushioning band 3.

The extremities of the coiled body of the tire are resiliently coupled together so as not to interfere with the shock absorbing properties thereof. The device used for this purpose preferably consists of a coiled spring 6 of somewhat less diameter than the main body coil. The pitch of the convolutions of the coupling coil 6 is substantially the same as the pitch of the coils of the main body of the tire so that by turning the coupling coil 6 within the extremities of the body coil, the threads of one coil will mesh with those of the other coil and thereby join or couple the extremities of the body coil to produce an endless coiled tire body which is resilient at all points throughout the length thereof.

In order to facilitate the manipulation of the resilient coupling 6, the extremities of said coupling member are deflected outwardly in a substantially radial direction to form projecting tongues or extremities 7 and 8 which normally prevent the coupling 6 from turning, but one of which is used as an aid for turning the resilient coupling 6 in one direction while the other extremity is used for turning said coupling in the opposite direction, it being understood that the coupling 6 must be turned in one direction for connecting the ends of the body coil, and in the opposite direction for disconnecting the ends of the body coil. In turning the coupling 6, the resisting end or tongue 7 or 8 must, of course, be lifted out of engagement with the band 3.

Extending longitudinally through the entire body coil is a restraining member 9 preferably in the form of a flexible cable the extremities of which are provided with heads 10 adapted to be brought into engagement with a coupling 11 shown in detail in Fig. 5. The coupling 11 comprises an elongated or extended base 12 formed in its inner face with a groove 13 to receive the end portions of the restraining member 9. The coupling 11 is formed with a central orifice 14 through which the heads 10 of the member 9 are insertible and removable. Intersecting the orifice 14 are relatively smaller orifices 15 arranged at opposite sides of the central large orifice 14 and being internally shaped to engage the heads 10 and prevent the latter from pulling out of the coupling when the restraining member 9 is placed under tension.

In order to strain and contract the flexible restraining member 9, I provide one or more strainers, two of such strainers being shown in Fig. 2, each strainer comprising a threaded member 16 having an opening 17 extending transversely therethrough to receive the restraining member 9 as best illustrated in the detail view, Fig. 6. The opening 17 is preferably intersected by grooves 18 extending to the inner end of the member 16 so as to prevent chafing or injuring the cable 9 when the member 16 is forced outwardly in a radial direction with respect to the center of the wheel on which the tire is placed. Fitting over the member 16 is a cap 19 having an elongated base portion 20 and a central opening 21 extending therethrough and of materially greater diameter than the member 16 in order to enable the adjacent portions of the restraining member 9 to be drawn outwardly from the rim 1 and into the opening or cavity 21 in the cap 19. The opening 21 is intersected by grooves 22 extending longitudinally of the base 20, the points where the grooves 22 lead into the opening 21 being rounded as shown at 23 to prevent injury to the strands of the cable 9 when such is used as the restraining member. Upon the outer end of the member 16 a nut 24 is threaded and this nut may be readily turned for straining and contracting the member 9 by means of a wrench inserted between the adjacent convolutions of the body A of the tire. Any desired number of strainers may be employed for the purpose of drawing the flexible restraining member taut and forcing the inner portions of the convolutions of the body A against or into the body of the resilient cushioning band 3 to prevent the body of the tire from being rolled off the supporting rim.

In case one of the convolutions of the body coil A should become fractured, a perfectly reliable repair may be made at such point by the use of an additional resilient coupling 6 such as is used to primarily connect the extremities of the coil when placing the body of the tire upon the rim. The strainers also provide for relaxing the member 9 in order that the headed extremities 10 thereof may be disconnected from the coupling 11. When the tread portions of the convolutions of the tire body become worn to a considerable or dangerous extent, the restraining member 9 may be loosened and the tire body A may be partially turned on its longitudinal axis so as to present other portions of the convolutions in position for contact with the road surface. The tire may be shifted in this way a number of times thus greatly increasing the life and durability thereof.

From the foregoing description, taken in connection with the accompanying drawings, it will now be understood that the tire is not only resilient and capable of absorbing ordinary road shocks and jars but it is far more durable than the ordinary pneumatic tire and is not subject to punctures and blow outs as inflation is not employed. Furthermore, the convolutions being separated from each other, cause the tire to obtain a good grip on the road surface for traction purposes and also serving to prevent skidding.

Having thus described my invention, I claim:—

The combination of an annular supporting rim, a tire body consisting of a primarily straight cylindrical coil of spring metal, said coil being curved into annular shape to encircle the supporting rim, means for coupling together the extremities of the coil, a flexible coil restraining and clamping member passing longitudinally through the coiled body and pressing the inner portions of the convolutions of the coil toward the supporting rim, a coupling connecting the extremities of said restraining member, and means for straining said restraining member by forcibly shifting a portion thereof radially and outwardly.

In testimony whereof I affix my signature.

JOHN GREWE.